US006862501B2

(12) United States Patent
He (10) Patent No.: US 6,862,501 B2
(45) Date of Patent: *Mar. 1, 2005

(54) METHOD FOR PRODUCING 3D PERSPECTIVE VIEW AVIONICS TERRAIN DISPLAYS

(75) Inventor: Gang He, Morristown, NJ (US)

(73) Assignee: Honeywell International Inc., Morristown, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 10/282,709

(22) Filed: Oct. 28, 2002

(65) Prior Publication Data

US 2004/0083038 A1 Apr. 29, 2004

(51) Int. Cl.[7] ............................................... G06F 7/00
(52) U.S. Cl. ............................... 701/3; 701/14; 707/6; 345/419; 345/606
(58) Field of Search ......................... 701/3, 9, 10, 14, 701/1, 6; 345/426, 420, 421, 419, 423, 606, 422, 441, 502, 503, 522, 440, 440.1; 340/961, 963, 973, 945, 971, 949, 968, 980; 342/35, 65, 63, 26, 58, 268

(56) References Cited

U.S. PATENT DOCUMENTS

| 4,876,651 | A | | 10/1989 | Dawson et al. | |
|---|---|---|---|---|---|
| 5,140,532 | A | * | 8/1992 | Beckwith et al. | 358/1.1 |
| 5,363,107 | A | * | 11/1994 | Gertz et al. | 342/26 |
| 5,974,423 | A | * | 10/1999 | Margolin | 345/606 |
| 6,023,278 | A | * | 2/2000 | Margolin | 345/419 |
| 6,043,756 | A | * | 3/2000 | Bateman et al. | 340/945 |
| 6,177,943 | B1 | * | 1/2001 | Margolin | 345/419 |
| 6,317,690 | B1 | * | 11/2001 | Gia | 701/301 |
| 6,426,750 | B1 | * | 7/2002 | Hoppe | 345/428 |
| 6,484,072 | B1 | * | 11/2002 | Anderson et al. | 701/9 |
| 6,501,392 | B2 | * | 12/2002 | Gremmert et al. | 340/971 |
| 6,600,489 | B2 | * | 7/2003 | Cook | 345/426 |
| 6,678,588 | B2 | * | 1/2004 | He | 701/3 |

OTHER PUBLICATIONS

Hoppe, H. "View–Dependent Refinement of Progressive Meshes". Retrieved from Internet: <URL:http://research.microsoft.com/~hoppe/.

Duchaineau, M.; Wolinksy, M.; Sigeti, D.E.; Miller, M.C.; Aldrich, C.; Mineev–Weinstein, M.B., "ROAMing Terrain: Real–time Optimally Adapting Meshes", 1997 pp. 81–88, Los Alamos NM, Livermore, CA.

* cited by examiner

Primary Examiner—Jacques H. Louis-Jacques (57) ABSTRACT

Methods for generating information for displaying terrain on an aircraft display system that significantly reduces the computation and data load for producing the terrain display. This is accomplished through the use of intelligent level of detail control that computes and displays terrain and dynamic on-terrain perspective projection lines and distance rings aligned with the aircraft heading for depth perception and relative altitude awareness. The terrain details are processed and displayed in a manner that shows all significant terrain features, e.g., peaks, towers, and the like, but through the use of nonlinear error bound geometric morphing, coupled with triangle binary tree based terrain mesh generation, the polygon count, and thus the computational load, are significantly reduced, while visual fidelity is maintained.

20 Claims, 6 Drawing Sheets

METHOD FOR PRODUCING 3D PERSPECTIVE VIEW AVIONICS TERRAIN DISPLAYS

FIELD OF THE INVENTION

The present invention relates to a display for a vehicle, and more particularly to a display for an aircraft flight management system that also displays terrain features.

BACKGROUND OF THE INVENTION

Modern map displays, particularly those used in aircraft for flight planning and monitoring, are capable of displaying a considerable amount of information such as flight planning information and terrain information. The terrain information consists of situational awareness (SA) terrain and terrain cautions and warnings that, among other things, may indicate where the aircraft may potentially impact terrain. The flight planning information consists of flight path information, altitude information and other information useful to a pilot or crewmember in following and anticipating the path and altitude of the aircraft over the ground.

Three dimensional perspective representations of terrain or out-of-window displays provide better spatial understanding and situation awareness and therefore reduce the navigational workload for a flight crew. These displays are particularly effective at presenting impending danger in the tactical range. In particular, when a 3D terrain representation is used, it aids the flight crew in detecting potential flight path conflicts with terrain as well as planning for optimal paths around potentially hazardous areas in comparison to other display formats (planar or vertical profile only). A flight path display with a terrain underlay will also significantly enhance the perception of depth and relative location during the flight path visualization therefore reducing flight crew work load and improving the vertical awareness relative to terrain, especially when entering flat terrain.

There are significant challenges to producing such displays since such displays frequently must cover a large area of terrain in order to show look-ahead distance compatible with visibility range for typical approach, landing, and take-off phases of flight. Generating the displays in real time with a large amount of terrain data presents significant difficulties for avionics flight management and display systems including the difficulty of performing the enormous computational tasks associated with providing detailed terrain representations over a large area. Generating a display under these circumstances using regular square grids is very computation intensive and leads to visual artifacts. Since on-board avionics systems must be capable of handling multiple outputs (for example, terrain, EGPWS, lateral mapping, weather, etc.) on an integrated display at a sustained frame rate, system throughput must be obtained by reducing as much as possible the computational overhead of each of the tasks.

BRIEF SUMMARY OF THE INVENTION

The instant invention addresses the aforementioned difficulties by significantly reducing the computation and data load for producing the terrain display for flight management systems. This is accomplished through the use of intelligent level of detail control that computes and displays terrain and dynamic on-terrain perspective projection lines and distance rings aligned with the aircraft heading for depth perception and relative altitude awareness. The terrain details are processed and displayed in a manner that shows all significant terrain features, e.g., peaks, towers, and the like, but through the use of nonlinear error bound geometric morphing, coupled with triangle binary tree based terrain mesh generation, the polygon count, and thus the computational load, are significantly reduced, while visual fidelity is maintained.

BRIEF DESCRIPTION OF THE DRAWINGS

The present invention will hereinafter be described in conjunction with the appended drawing figures, wherein like numerals denote like elements, and in which.

DETAILED DESCRIPTION OF THE INVENTION

The present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed.

It should be appreciated that the particular implementations shown and described herein are illustrative of the invention and its best mode and are not intended to otherwise limit the scope of the invention in any way.

Figure 1:
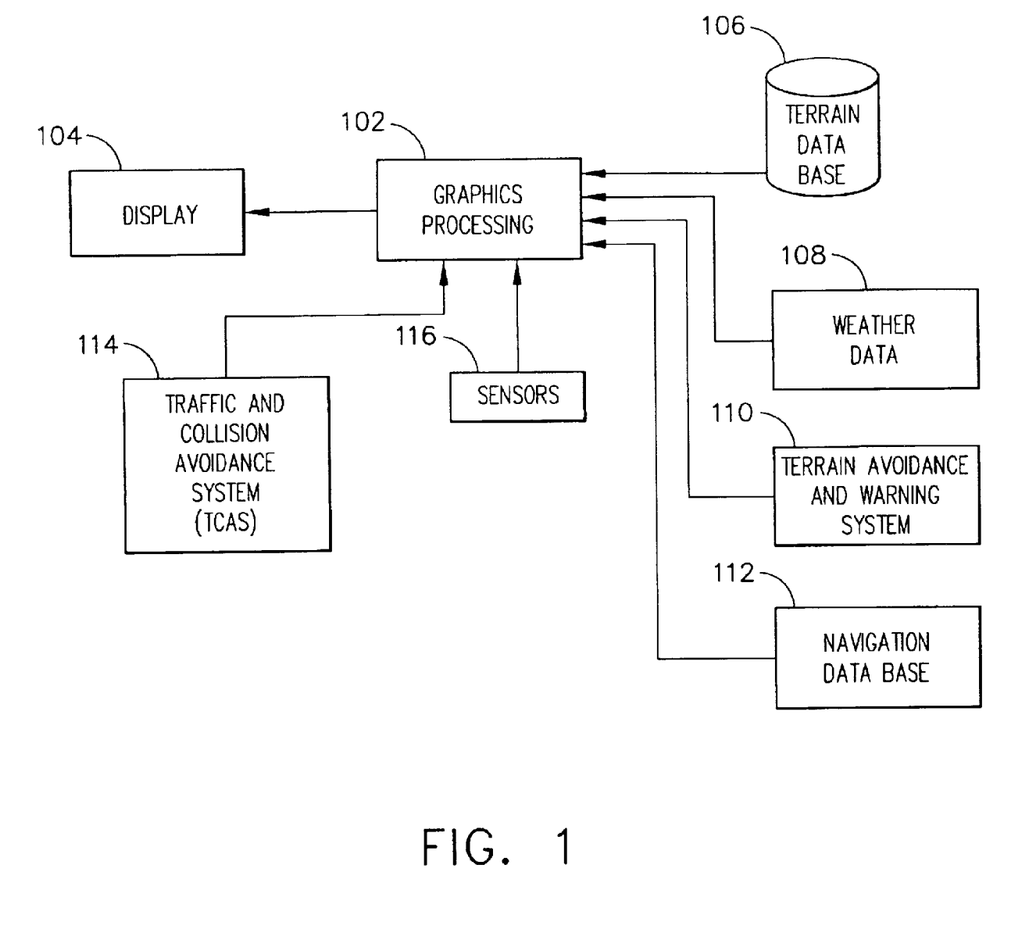
FIG. 1 is a block diagram of a flight management display system usable with the instant invention.

In FIG. 1, an exemplary flight management display system 100 includes a graphics processor 102 configured to provide information to a display element or monitor 104. One or more data sources are coupled to the processor 102. These data sources may be, but are not limited to, a terrain data base 106, weather radar data source 108 from an on-board weather radar unit or from an external weather data source such as a ground-based weather data source or a satellite weather data source, a terrain avoidance and warning system (TAWS) 110, a navigation data base 112, a traffic and collision avoidance system (TCAS) 114 or other sensors 116 which may provide additional useful information to a user.

A number of aspects of display element 104 (which are controlled by processor 102 in a practical embodiment) may contribute to the improved contents and appearance of the display, thus increasing the situational and terrain awareness of the pilot and/or flight crew. The image generation and display aspects may leverage known techniques such that existing display systems can be modified in a straightforward manner to support the different features described herein. In a practical implementation, the concepts described herein may be realized in the form of revised display generation software or processing resident at processor 102.

Processor 102 encompasses one more functional blocks used to provide a flight management, navigational, weather, terrain, and positional interface with the pilot, and input to display element 104. Processor 102 may include or cooperate with a mode, position and/or detection element that is capable of determining the mode or position of the vehicle relative to one or more reference locations, points, planes, or navigation aids. In addition, processor 102 may be configured to receive, analyze, condition, and process navigation and positional information, including flight path information as well as weather information associated with the vehicle. In this regard, processor 102 may include any number of individual microprocessors, flight computers, navigation equipment, memories, storage devices, interface cards, and other standard components known in the art. Moreover, processor 102 may include any number of microprocessor elements, memory elements, power supplies, and other functional components as necessary to support the operation of the display system 100. In this respect, processor 102 may include or cooperate with any number of software programs or instructions designed to carry out various methods, process tasks, calculations, control functions, and the generation of display signals and other data used by display element or monitor 104. For example, processor 102 may be configured to generate an annunciator associated with the position of the aircraft relative to at least one reference location, to generate windows corresponding to user inputs, to combine inputs from various sensors to create a data stream for presentation to the display element 104, and the like.

Processor 102 may also be suitable configured to receive and process navigational data 112 related to an intended flight path and destination of the aircraft. In a practical commercial aircraft application, such navigational data 112 may be associated with specific waypoints, airports, navigational aids, or the like. As described in more detail below, processor 102 may process data from any of the data inputs shown above and generate appropriate signals to display element 104 such that display element 104 generates indicia representative of the appropriate navigational, weather, terrain, or other information, or the like. Such processors and flight control computers are available from a number of manufacturers such as Honeywell International Inc. In an exemplary embodiment, processor 102 is incorporated within a flight management system (FMS) or another avionics component that, inter alia, formats navigation data and forwards the data to monitor 104 for display as data on display 104.

Display element 104 may include any display element suitable for displaying the various symbols and information detailed below. Many currently known monitors are suitable for this task, including various CRT and flat-panel display systems. Display element 104 may be based on a panel mounted display, a HUD projection, or any known technology. In an exemplary embodiment, display element 104 includes a panel display. Display element 104 suitably includes various graphical elements associated with the environment of the aircraft including the location of various navigational aids including VHF Omnirange stations, non-directional beacons, radio stations, and the like, and airports, airways, special use airspace, and other aircraft.

In operation, the graphics processor 102 obtains inertial or other data (position, speed, direction) from the sensors 116. Based on the inertial data, the graphics processor 102 obtains terrain data and navigation data from the data bases 106, 112. These data bases are typically onboard the aircraft, but need not be limited to such a design. The graphics processor 102 renders a picture of the absolute terrain, and the navigation data (VORs, airports, airways, etc) and flight path is also rendered on the display element 104. The TAWS 110 provides data to the graphics processor 102 regarding the location of terrain that may be a threat to the aircraft. The graphics processor 102 may show the potential threat terrain in various colors depending on the level of threat: red for warnings (immediate danger), yellow for cautions (possible danger), and green for terrain that is not a threat Of course, other colors and different numbers of levels of threat can be provided as a matter of choice.

The variance in detail of the terrain is accomplished by utilizing graphing techniques that allow a display of reduced detail in certain areas as noted above, thereby reducing in those areas the processing workload of the graphics processor 102 of FIG. 1.

The terrain is depicted initially as a square patch of terrain having N×N terrain elevation data points which relate to the height at that location above sea level or some other arbitrary elevation reference point. When many of these data are specified, such as a square patch, it may be termed a terrain height field. Looking from a top-down perspective, it appears that these data points are laid out as a square. Terrain elevation data are usually given at discrete, regularly spaced points, say 100 meters apart (or some other appropriate distance, depending on the area to be covered and the detail required). In order to graphically represent the terrain, simple polygons are used to connect the data points to make them appear continuous on a graphic display. The connection of these discrete data points forms a mesh. Triangles may be used to connect the data points. These non-overlapping triangles form a triangle or polygon mesh. Alternatively, quad, Octal, or other shapes may be used to connect the data points.

The triangles (as used in this example) of the polygon mesh are further laid out as a triangle binary tree where the large triangles of the polygon mesh are divided into right and left halves, and these resultant triangles are further divided into smaller left and right halves, and so on until the desired degree of resolution is obtained. Because of the tree structure, any triangle can be traced up to the original large triangle. Again, binary trees other than triangle binary trees could be used and any such shape could be likewise traced up to the original large shape.

When a triangle binary tree is used to represent a square terrain patch or a polygon terrain mesh, sometimes three points are connected that are not necessarily close together. That is to say that a larger triangle of only three data points is used to represent more terrain data points enclosed by the triangle. This introduces certain errors in representation. The error bound array characterizes the levels of errors introduced when triangles of different sizes are used. When the smallest triangles are used, the errors will approach zero.

When the constant error bound is not set to zero, larger triangles may be used to represent terrain area as long as the representation errors are less than the selected error bound. Choosing a larger error bound has the effect of smoothing the displayed representation of the terrain such that only major features of the terrain are shown.

As the aircraft in which the Flight Management Display System of FIG. 1 travels over its course, new data points are continuously being retrieved from the Terrain Data Base 106 and mapped into triangle binary trees as noted above. This is a real-time adaptive process that provides the ability for the Graphics Processor 102 to vary the size of the triangles in the triangle binary tree in accordance with display requirements. When the display requirements dictate that a higher level of detail is required, larger triangles are split, and the newly formed triangles are split again, and so on until the requisite degree of detail is obtained. Splits will be instituted when the size of the existing triangle exceeds the error bound for that particular area of display. Since the goal of avionics displays is to efficiently and clearly present threats and situation awareness data rather than producing a replica of the out-of-window scene, efficient methods and optimal symbology must be used to produce such 3D perspective terrain displays.

One way to accomplish the desired presentation while minimizing the computational workload of the processor is to utilize a non-linear error bound approach in conjunction with the real-time adaptive triangle mesh to significantly reduce polygon count.

Figure 2:
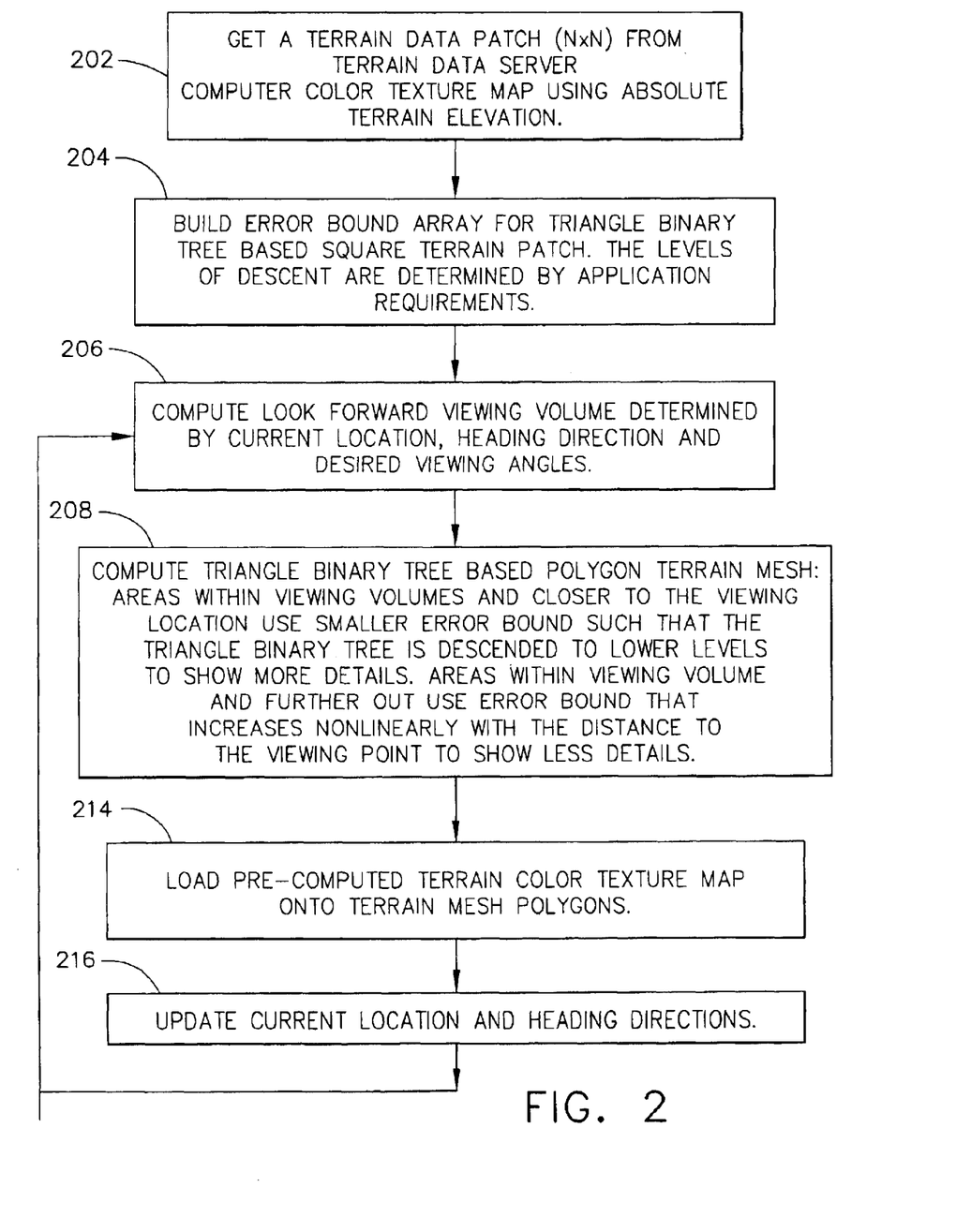
FIG. 2 is a flow chart diagram of one embodiment of the invention.

FIG. 2 is a flow chart diagram of one embodiment of the invention. In this embodiment the error bounds are selected so as to reduce the necessary computation load on the processor 102 by utilizing a smaller error bound closer to the viewing area of interest, i.e., the terrain near the aircraft, and a larger error bound at a distance from the viewing area of interest. The error bound, however, increases non-linearly with distance from the viewing area of interest.

A terrain data patch (N×N) is obtained (202) from the terrain database 106 (FIG. 1) for processing by graphics processor 102. The data patch contains N×N terrain elevation points. Each data point is color-coded based on the absolute terrain elevation at the point.

An error bound array for a triangle binary tree based square terrain patch is constructed (204) as set forth above. The size of the triangles in the array is determined based upon the particular application requirements.

The look forward viewing volume is determined by the current location, heading direction, and viewing angle desired (206).

A triangle binary tree based polygon mesh is computed (208). The areas within the viewing volume and closer to the viewing location use smaller error bounds such that the triangle binary tree is descended to lower levels to show more detail. Areas within the viewing volume and farther away from the aircraft use error bounds that increase non-linearly with the distance to the viewing point to show less detail.

The terrain color texture map that was computed in 202 is loaded onto the terrain mesh polygons (214) and displayed on the display 104 of FIG. 1. The current location and heading direction of the aircraft are updated (216) and a new look forward viewing volume is computed (206), and the process is iterated.

While the process of FIG. 2 reduces the computational load on graphics processor 102, the use of a non-linear error bound increase sometimes causes distant features on the terrain map, such as hills or mountains, to "pop" out. To avoid this condition a geometric morphing approach may be used. Mesh connectivity (and, thereby, a split in a triangle) is modified immediately when split conditions are met, i.e., when the error bound of the area being displayed is exceeded and when higher displayed details are required to avoid artifacts. The height of the terrain is gradually shifted from interpolated height to the real height over time. This allows farther-out peaks and bumps to "grow out" rather than "pop out" on the display. Here, parameters are computed as a function of the local nonlinear error bound values. These parameters are then used to control smoothness and duration of lower detail displayed terrain area transition to higher display details. As such higher terrain details will gradually appear without the "popping" out feel.

Figure 3:
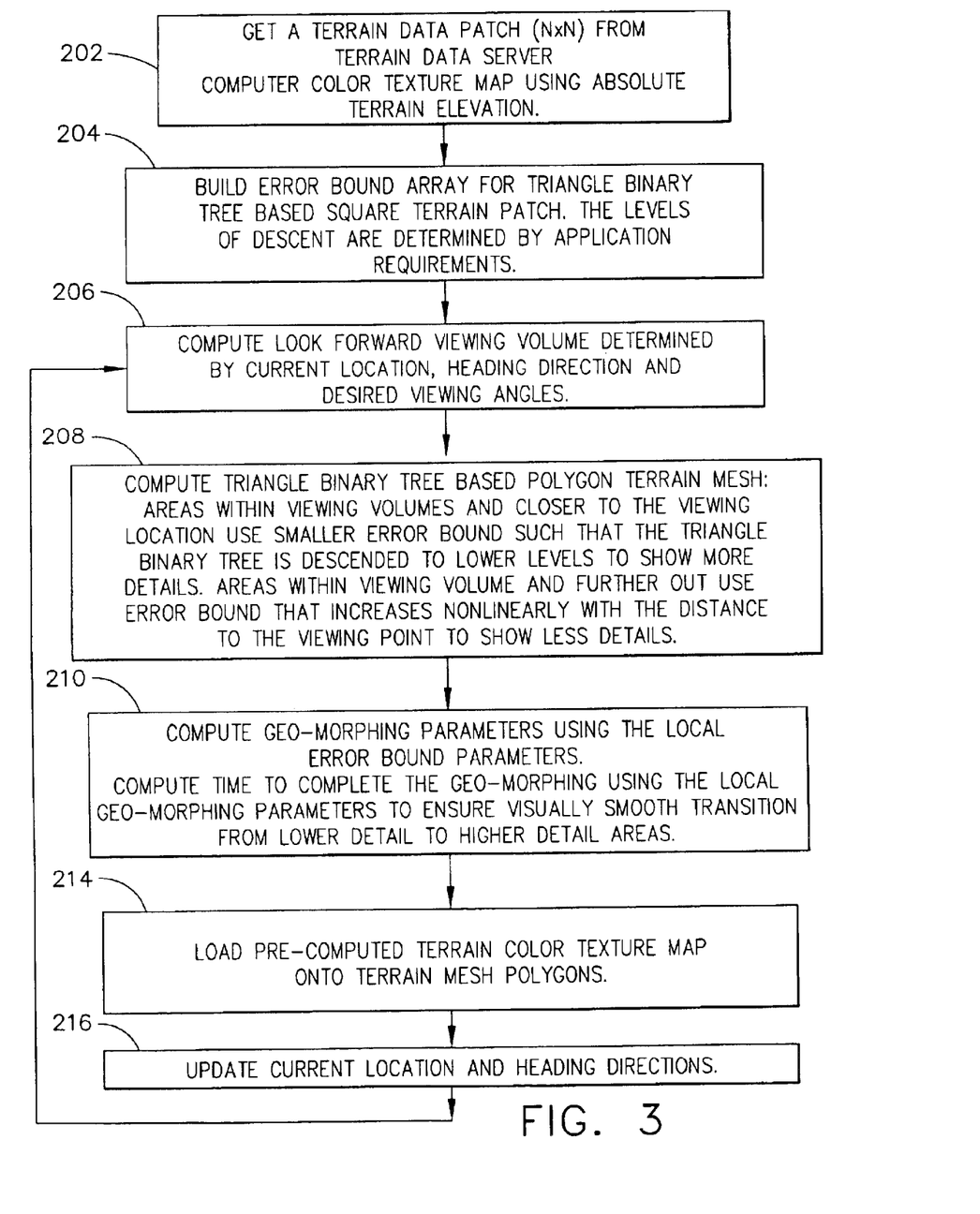
FIG. 3 is a flow chart diagram of another embodiment of the invention.

FIG. 3 is a flow chart diagram of another embodiment of the invention that incorporates geometric morphing into the display generation process. Steps 202, 204, 206, and 208 proceed as in the process of FIG. 2.

The triangle binary tree based polygon mesh is computed (208). The areas within the viewing volume and closer to the viewing location use smaller error bounds such that the triangle binary tree is descended to lower levels to show more detail. Areas within the viewing volume and farther away from the aircraft use error bounds that increase non-linearly with the distance to the viewing point to show less detail.

The geo-morphing parameters for a data patch are computed (210) using the local error bound parameters. When aircraft is moving forward, the geo-morphing of the area further out from the viewer is controlled using the geo-morphing parameters to ensure a visually smooth transition from lower detail displays to higher detail displays.

The terrain color texture map that was computed in 202 is loaded onto the terrain mesh polygons (214) and displayed on the display 104 of FIG. 1. The current location and heading direction of the aircraft are updated (216) and a new look forward viewing volume is computed (206), and the process is iterated.

To further aid the aircrew in vertical awareness, particularly in flat terrain, it is useful to provide on a display dynamic on-terrain perspective projection lines aligned with the heading of the aircraft for improved depth perception and relative altitude awareness. Such projection lines and range rings are dynamically computed using the geo-morphed triangle mesh to ensure that the lines trace the terrain surfaces.

Figure 4:
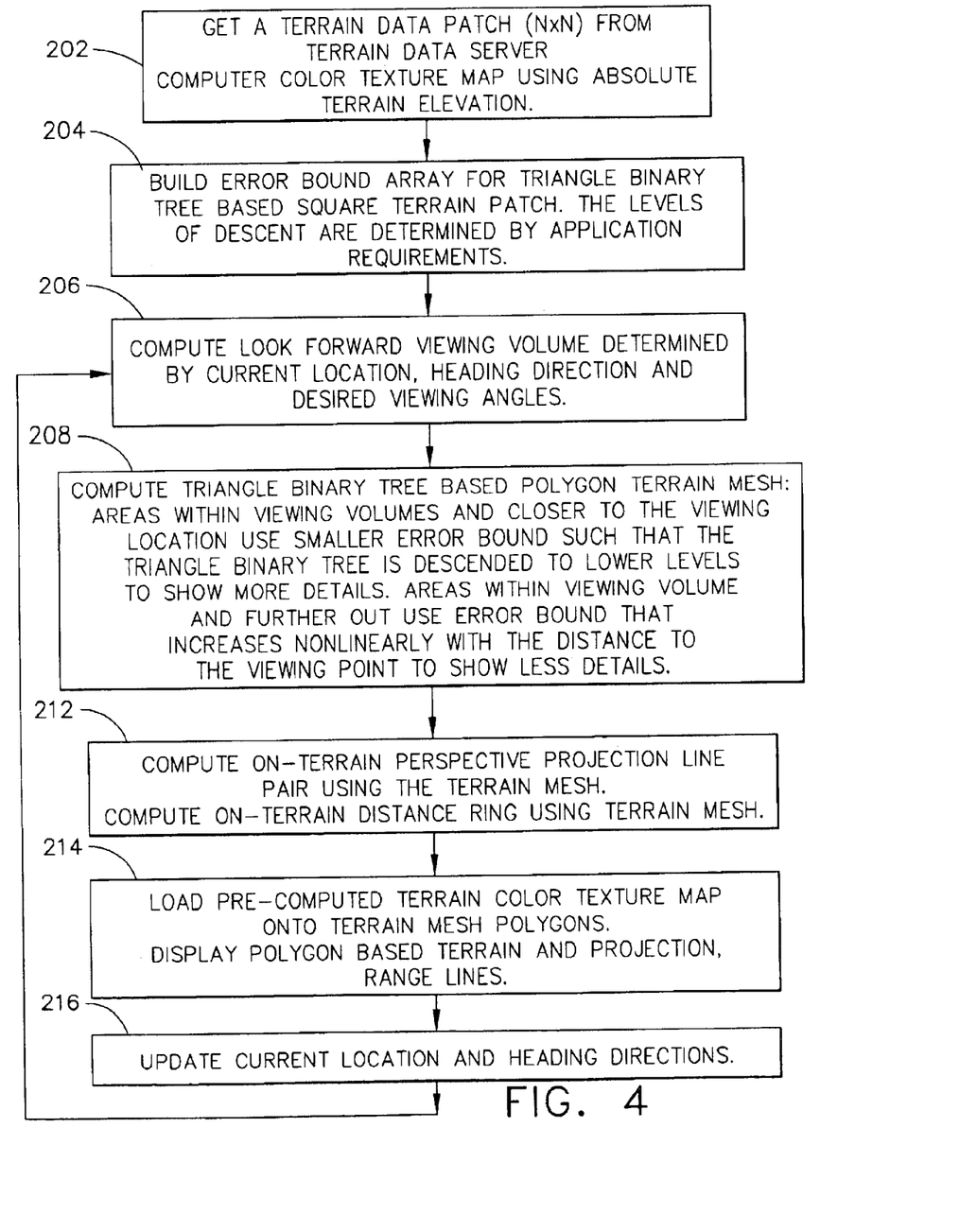
FIG. 4 is a flow chart diagram of still another embodiment of the invention.

FIG. 4 is a flow chart diagram of another embodiment of the method of the instant invention that incorporates on-terrain perspective projection lines and on-terrain distance rings together with a non-linear error bound array similar to that of the method of FIG. 2.

As in FIG. 2, the error bounds for the triangle binary array are selected so as to reduce the necessary computation load on the processor 102 by utilizing a smaller error bound closer to the viewing area of interest, i.e., the terrain near the aircraft, and a larger error bound at a distance from the viewing area of interest. The error bound, however, increases non-linearly with distance from the viewing area of interest.

A terrain data patch (N×N) is obtained (202) from the terrain database 106 (FIG. 1) for processing by graphics processor 102. The data patch contains N×N terrain elevation points. Each data point is color-coded based on the absolute terrain elevation at the point.

An error bound array for a triangle binary tree based square terrain patch is constructed (204) as set forth above. The size of the triangles in the array is determined based upon the particular application requirements.

The look forward viewing volume is determined by the current location, heading direction, and viewing angle desired (206).

A triangle binary tree based polygon mesh is computed (208). The areas within the viewing volume and closer to the viewing location use smaller error bounds such that the triangle binary tree is descended to lower levels to show more detail. Areas within the viewing volume and farther away from the aircraft use error bounds that increase non-linearly with the distance to the viewing point to show less detail.

Following the computation of the triangle binary tree based polygon mesh (208), a dynamic on-terrain perspective projection line pair is computed (212) using the terrain mesh. While the preferred embodiment of this method has a pair of dynamic perspective projection lines, it is possible to provide only one line or more than two lines. It has been found that two lines adequately fulfill the need for vertical awareness that is the object of providing these lines.

As noted above, the perspective projection lines are computed using the terrain mesh. This allows the lines to be created dynamically; i.e., as the terrain display changes, the perspective projection lines also change, tracing the surface of the irregular triangle terrain mesh. The lines are aligned with the current heading direction and are centered at the current aircraft location to indicate the heading, immediate terrain danger areas, and to provide clear vertical relative altitude awareness, since the fixed separation between the lines will appear wider when viewed at lower altitude and narrower when viewed at higher altitude.

In addition to the dynamic perspective projection lines, on-terrain distance rings may also be computed (212). The distance rings are also computed using the terrain mesh, allowing the rings to be created dynamically; i.e., as the terrain display changes, the distance rings also change, tracing the surface of the irregular triangle terrain mesh. The lines are centered at the current aircraft location. While in a preferred embodiment two distance rings are used, any number could be used depending upon the scale of the mapped area and general preferences.

The terrain color texture map that was computed in 202 is loaded onto the terrain mesh polygons (214) and displayed on the display 104 of FIG. 1. The current location and heading direction of the aircraft are updated (216) and a new look forward viewing volume is computed (206), and the process is iterated.

Figure 5:
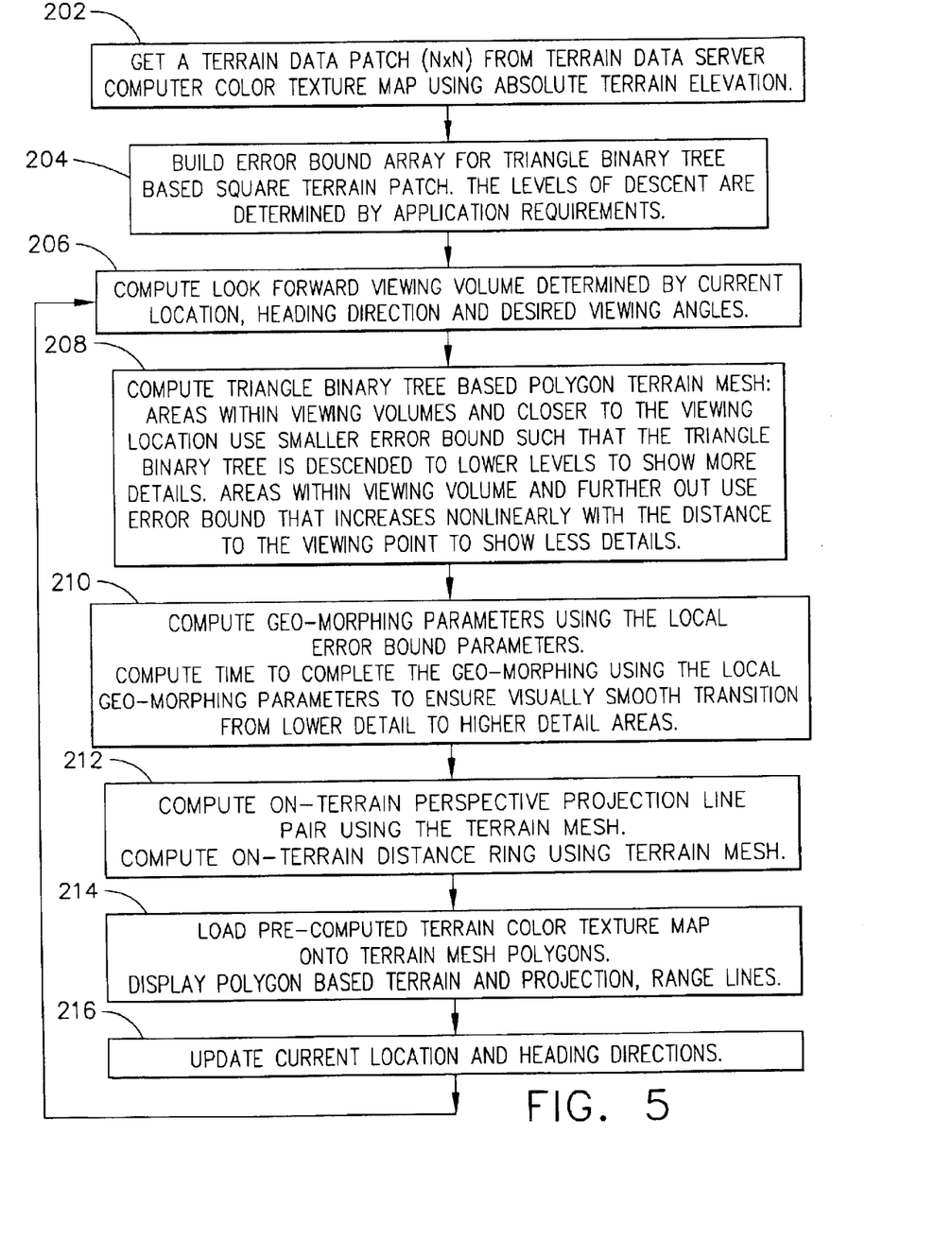
FIG. 5 is a flow chart diagram of still another embodiment of the invention.

FIG. 5 is a flow chart diagram of yet another embodiment of the instant invention that incorporates on-terrain perspective projection lines and on-terrain distance rings together with a non-linear error bound array and geo-morphing.

As in FIG. 3, the error bounds for the triangle binary array are selected so as to reduce the necessary computation load on the processor 102 by utilizing a smaller error bound closer to the viewing area of interest, i.e., the terrain near the aircraft, and a larger error bound at a distance from the viewing area of interest. The error bound, however, increases non-linearly with distance from the viewing area of interest.

A terrain data patch (N×N) is obtained (202) from the terrain database 106 (FIG. 1) for processing by graphics processor 102. The data patch contains N×N terrain elevation points. Each data point is color-coded based on the absolute terrain elevation at the point.

An error bound array for a triangle binary tree based square terrain patch is constructed (204) as set forth above. The size of the triangles in the array is determined based upon the particular application requirements.

The look forward viewing volume is determined by the current location, heading direction, and viewing angle desired (206).

A triangle binary tree based polygon mesh is computed (208). The areas within the viewing volume and closer to the viewing location use smaller error bounds such that the triangle binary tree is descended to lower levels to show more detail. Areas within the viewing volume and farther away from the aircraft use error bounds that increase non-linearly with the distance to the viewing point to show less detail.

The geo-morphing parameters for a data patch are computed (210) using the local error bound parameters. The geo-morphing is completed using the geo-morphing parameters to ensure a visually smooth transition from areas of lower detail to areas of higher detail. The height of the terrain is gradually shifted from interpolated height to the real height over time. This allows farther-out peaks and bumps to "grow out" rather than "pop out" on the display.

Following the computation of the geo-morphing parameters (210), a dynamic on-terrain perspective projection line pair is computed (212) using the terrain mesh as previously described. Again, while the preferred embodiment of this method has a pair of dynamic perspective projection lines, it is possible to provide only one line or more than two lines. It has been found that two lines adequately fulfill the need for vertical awareness that is the object of providing these lines.

As noted above, the perspective projection lines are computed using the terrain mesh. This allows the lines to be created dynamically; i.e., as the terrain display changes, the perspective projection lines also change, tracing the surface of the irregular triangle terrain mesh. Again, the lines are aligned with the current heading direction and are centered at the current aircraft location to indicate the heading, immediate terrain danger areas, and to provide clear vertical relative altitude awareness.

In addition to the dynamic perspective projection lines, on-terrain distance rings may also be computed (212). The distance rings are also computed using the terrain mesh, allowing the rings to be created dynamically; i.e., as the terrain display changes, the distance rings also change, tracing the surface of the irregular triangle terrain mesh. The lines are centered at the current aircraft location. While in a preferred embodiment two distance rings are used, any number could be used depending upon the scale of the mapped area and general preferences.

The terrain color texture map that was computed in 202 is loaded onto the terrain mesh polygons (214) and displayed on the display 104 of FIG. 1. The current location and heading direction of the aircraft are updated (216) and a new look forward viewing volume is computed (206), and the process is iterated.

Figure 6:
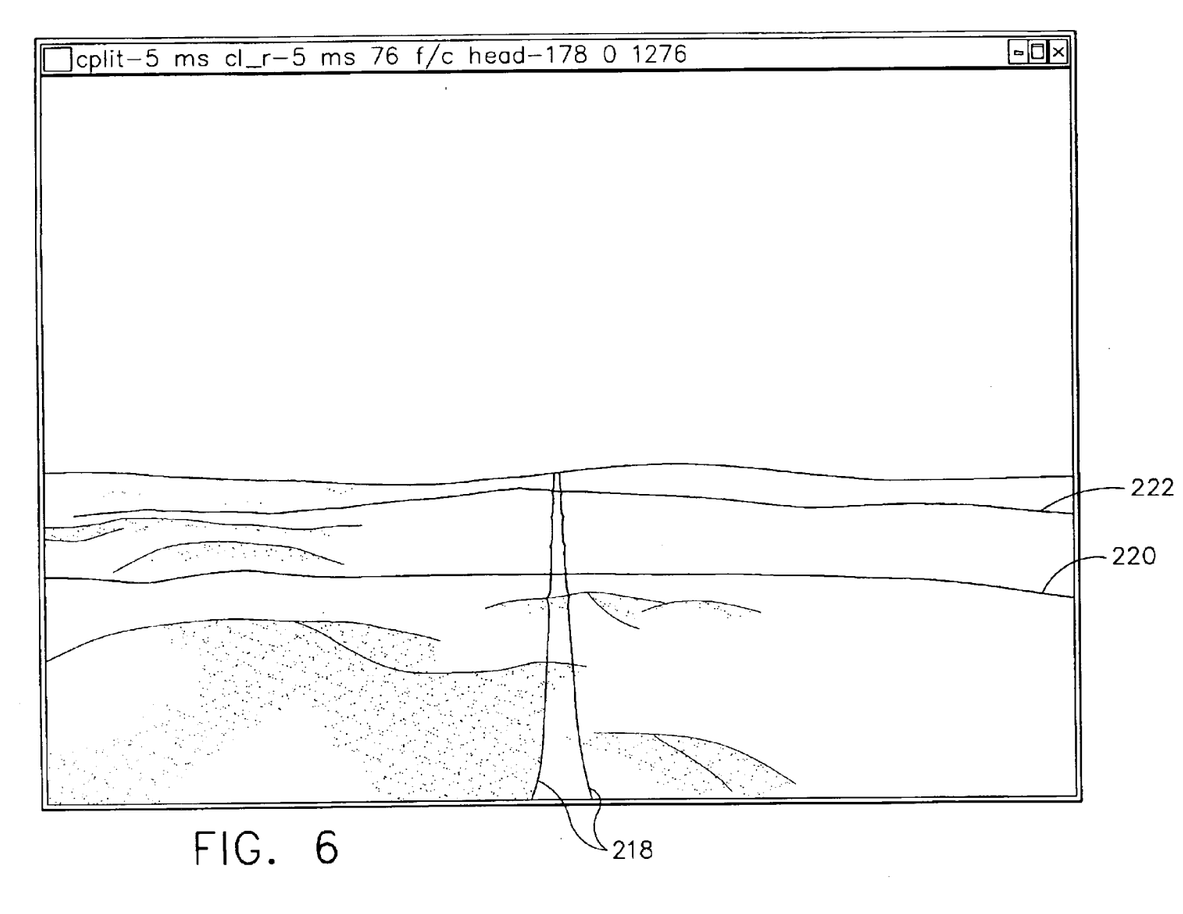
FIG. 6 is a representation of a terrain display.

FIG. 6 is a representation of a terrain display with a dynamic perspective projection line pair 218 and a pair of distance rings 220 and 222, representing 5 nautical miles distance and 10 nautical miles distance, respectively.

While the invention has been described in terms related to the preferred embodiment disclosed herein, it will become apparent to those skilled in the art that modifications may be made which however remain within the scope of the appended claims.

What is claimed is:

1. In an aircraft display system having a processor for processing data for displaying terrain, a method for reducing the required computational load on the processor comprising:

obtaining terrain data from a data source, and using the terrain data to construct a polygon terrain mesh, the polygon terrain mesh having error bounds that increase non-linearly from a viewing location.

2. A method as set forth in claim 1 wherein the terrain data comprises a terrain data patch having terrain location and terrain elevation data.

3. A method as set forth in claim 2 wherein the terrain data patch is used to compute a color texture map using absolute terrain elevation data.

4. A method as set forth in claim 3 wherein the terrain data patch is used to construct an error bound array for a triangle binary tree based terrain patch, and the polygon terrain mesh is constructed using the error bound array.

5. A method as set forth in claim 4 wherein the color texture map is loaded onto the polygon terrain mesh to produce a color polygon terrain representation for display.

6. In an aircraft display system having a processor for processing data for displaying terrain, a method for reducing the required computational load on the processor comprising:

obtaining terrain data from a data source, using the terrain data to construct a polygon terrain mesh, the polygon terrain mesh having error bounds that increase non-linearly from a viewing location providing higher resolution nearer the viewing location, computing geo-morphing parameters based on the error bound, and using the parameters to control geo-morphing range and duration to ensure visually smooth transitions from lower resolution displays to higher resolution displays.

7. A method as set forth in claim 6 wherein the terrain data comprises a terrain data patch having terrain location and terrain elevation data.

8. A method as set forth in claim 7 wherein the terrain data patch is used to compute a color texture map using absolute terrain elevation data.

9. A method as set forth in claim 8 wherein the terrain data patch is used to construct an error bound array for a triangle binary tree based terrain patch, and the polygon terrain mesh is constructed using the error bound array.

10. A method as set forth in claim 9 wherein the color texture map is loaded onto the polygon terrain mesh to produce a color polygon terrain representation for display.

11. In an aircraft display system having a processor for processing data for displaying terrain, a method for reducing the required computational load on the processor comprising:

obtaining terrain data from a data source, using the terrain data to construct a polygon terrain mesh, the polygon terrain mesh having error bounds that increase non-linearly from a viewing location, and using the terrain mesh, dynamically generating terrain-tracing perspective projection lines.

12. A method as set forth in claim 11 wherein the terrain data comprises a terrain data patch having terrain location and terrain elevation data.

13. A method as set forth in claim 12 wherein the terrain data patch is used to compute a color texture map using absolute terrain elevation data.

14. A method as set forth in claim 13 wherein the terrain data patch is used to construct an error bound array for a triangle binary tree based terrain patch, and the polygon terrain mesh is constructed using the error bound array.

15. A method as set forth in claim 14 wherein the color texture map is loaded onto the polygon terrain mesh to produce a color polygon terrain representation for display.

16. In an aircraft display system having a processor for processing data for displaying terrain, a method for reducing the required computational load on the processor comprising:

obtaining terrain data from a data source, using the terrain data to construct a polygon terrain mesh, the polygon terrain mesh having error bounds that increase non-linearly from a viewing location providing higher resolution nearer the viewing location, computing geo-morphing parameters based on the error bound, using the parameters to control geo-morphing range and duration to ensure visually smooth transitions from lower resolution displays to higher resolution displays, and dynamically generating terrain-tracing range rings using the geo-morphed polygon terrain mesh.

17. A method as set forth in claim 16 wherein the terrain data comprises a terrain data patch having terrain location and terrain elevation data.

18. A method as set forth in claim 17 wherein the terrain data patch is used to compute a color texture map using absolute terrain elevation data.

19. A method as set forth in claim 18 wherein the terrain data patch is used to construct an error bound array for a triangle binary tree based terrain patch, and the polygon terrain mesh is constructed using the error bound array.

20. A method as set forth in claim 19 wherein the color texture map is loaded onto the polygon terrain mesh to produce a color polygon terrain representation for display.

* * * * *